United States Patent [19]

Wheelock

[11] 3,850,811

[45] Nov. 26, 1974

[54] MAGNETIC FILTER

[75] Inventor: Barrie Neil Wheelock, Bexley Heath, England

[73] Assignee: U.S. Philips Corporation, New York, N.Y.

[22] Filed: Feb. 1, 1974

[21] Appl. No.: 438,657

Related U.S. Application Data

[63] Continuation of Ser. No. 265,258, June 22, 1972, abandoned.

[30] Foreign Application Priority Data

June 25, 1971  Great Britain .................. 29940/71

[52] U.S. Cl. ............... 210/223, 209/223, 209/232
[51] Int. Cl. ........................................... B01d 35/06
[58] Field of Search .......... 210/222, 223, 336, 411; 209/223, 232; 55/100, 444, 445, 446

[56] References Cited
UNITED STATES PATENTS

| | | |
|---|---|---|
| 722,272 | 3/1903 | Baker .................................. 55/444 |
| 2,792,115 | 5/1957 | Medearis .......................... 209/223 |
| 2,976,995 | 3/1961 | Lorrer ................................ 209/232 |
| 3,343,676 | 9/1967 | Tyrell ................................. 210/223 |
| 3,581,898 | 6/1971 | Tyrell ................................. 210/222 |
| 3,768,233 | 10/1973 | Mapesen ........................ 210/222 X |

FOREIGN PATENTS OR APPLICATIONS 114,491  4/1926  Switzerland ......................... 55/444

*Primary Examiner*—Theodore A. Granger
*Attorney, Agent, or Firm*—Frank R. Trifari

[57] ABSTRACT

A magnetic pipeline filter having a plurality of filtering grids each consisting of a row of spaced parallel strips of magnetizable material, the rows extending in the direction of flow of the fluid being filtered, in which the strips of each grip form a zigzag pattern so that the ferromagnetic particles trapped in the gaps between the strips during the operation of the filter are more readily flushed from these gaps during backflushing of the filter.

5 Claims, 4 Drawing Figures

3,850,811

MAGNETIC FILTER

This is a continuation, of application Ser. No. 265,258, filed June 22, 1972 now abandoned.

BACKGROUND OF THE INVENTION

This invention relates to a magnetic filter for separating ferromagnetic particles from a fluid. The invention relates particularly to a magnetic filter of the kind comprising a filtering grid arranged in a duct for the fluid to be filtered; the invention comprises a row of spaced parallel strips of magnetizable material, the row extending longitudinally of the duct, and each strip in the row extending transversely of the duct, and means are provided for magnetizing the grid. Permanent magnetic or electromagnetic means may be used for this purpose.

In the operation of such a filter, which usually has a plurality of said filtering grids arranged across the duct, particles of ferromagnetic contaminant in the fluid flowing through the filter are attracted by the magnetic fields in the gaps between the strips of each filtering grid and become trapped in these gaps. The filter is cleaned by a backflushing operation which entails demagnetising the filtering grids and causing fluid to flow back through the filter to flush the trapped particles of contaminant from the grids.

In the known filters of the above kind the strips of each filtering grid are co-planar, with the result that the particles of contaminant trapped in the gaps between the strips are to some extent sheltered from the backflushing flow of fluid. This is not conducive to efficient backflushing.

SUMMARY OF THE INVENTION

According to the invention there is provided a magnetic filter comprising a filtering grid arranged in a duct for the fluid to be filtered and comprising a row of spaced parallel strips of magnetisable material, the row extending longitudinally of the duct each strip in the row extending transversely of the duct; means are provided for magnetising the grid, wherein adjacent strips of the grid lie in planes which intersect one another so that the strips of the grid, viewed end on, form a zigzag pattern.

Preferably, the downstream edge of each strip faces and is spaced from a side of the adjacent strip in the downstream direction at the upstream edge thereof to form a gap for trapping particles of ferromagnetic contaminant. This gap provides a sheltered collecting point for particles of contaminant during filtering, but during backflushing the gap is directly open to the flow of fluid through the filter so that the collected contaminant is completely flushed from the gap. The terms "upstream" and "downstream" relate to the direction of flow through the filter during filtering.

In an embodiment of the invention in which several of said filtering grids are arranged across the duct, the strips of the grids form rows extending transversely of the duct with the strips in each row lying parallel to one another in parallel planes so that zigzag paths are formed between the grids for the flow of fluid through the duct.

In order that the invention may be readily carried into effect, an embodiment thereof will now be described with reference to the drawings accompanying the provisional specification.

DESCRIPTION OF THE PREFERRED EMBODIMENT

Figure 1:
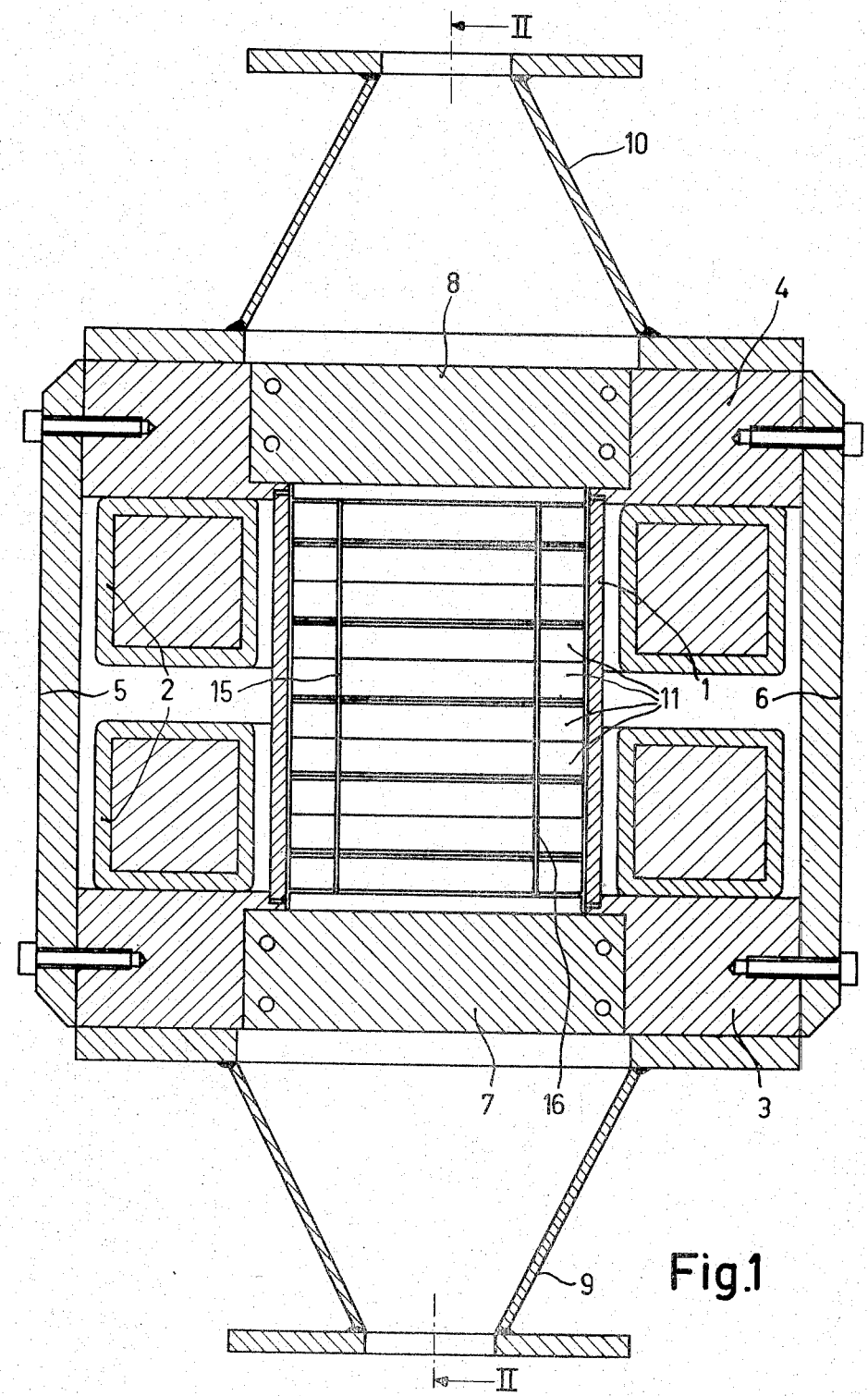
FIG. 1 is an axial sectional view of a filter constructed in accordance with the invention.
Figure 2:
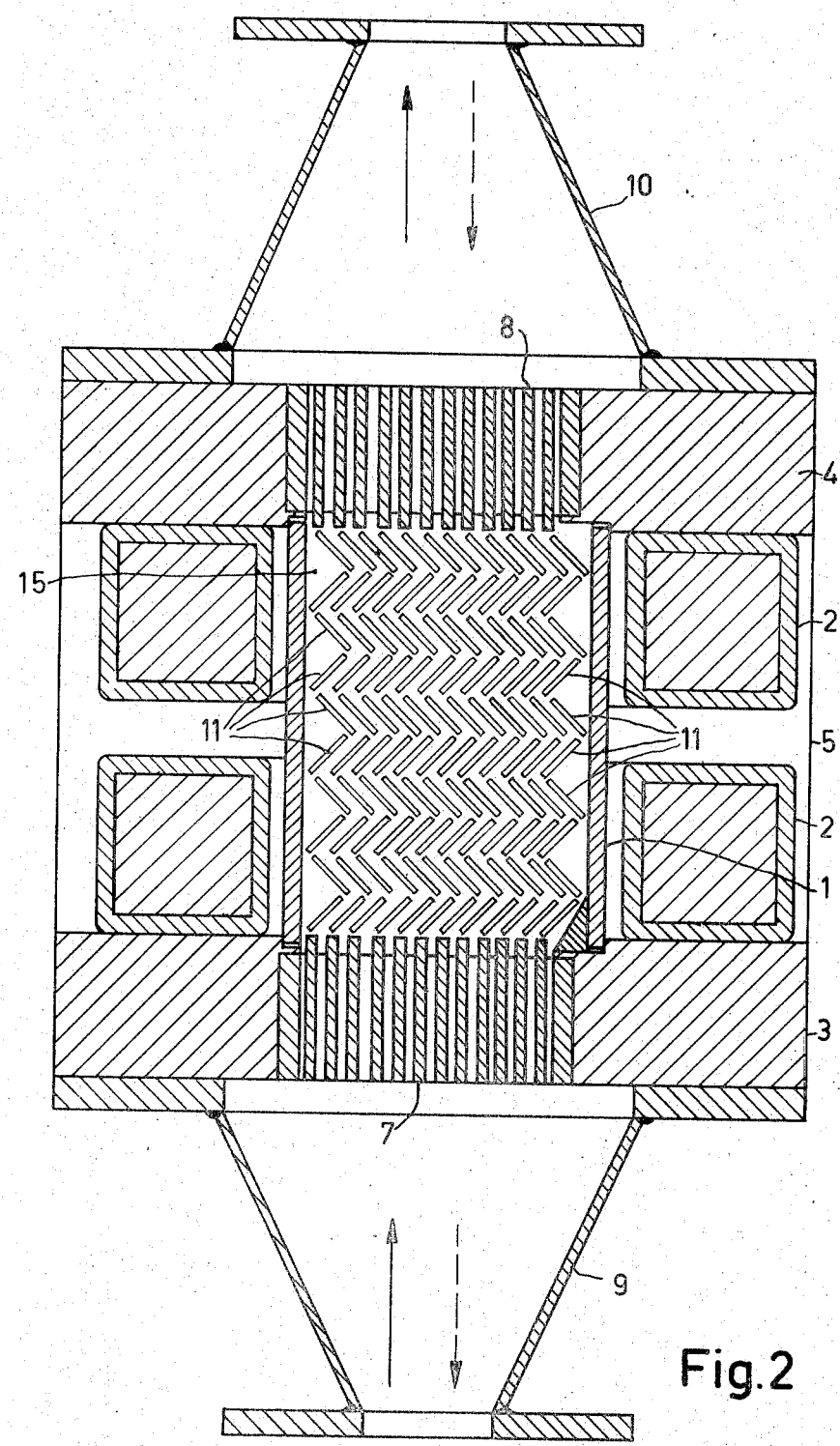
FIG. 2 is a sectional view taken on the line II—II of FIG. 1.

The filter shown in FIGS. 1 and 2 comprises a tubular housing 1 having a rectangular cross-section and made of a non-magnetisable material, for example, stainless steel or P.V.C. The housing, which forms a duct for the fluid to be filtered, contains a plurality of filtering grids, which will be described later herein, and is surrounded by energising coils 2 for magnetising the grids. The housing 1 is held between two mild steel pole plates 3 and 4 which are connected by yokes 5 and 6 consisting of soft-iron plates. Slotted gratings 7 and 8, also made of soft-iron, are incorporated in the pole plates 3 and 4 respectively and are arranged to extend one over each end of the housing 1. Flanged pipe connections 9 and 10 are provided one on each pole plate to enable the filter to be coupled into a pipeline.

Figure 3:
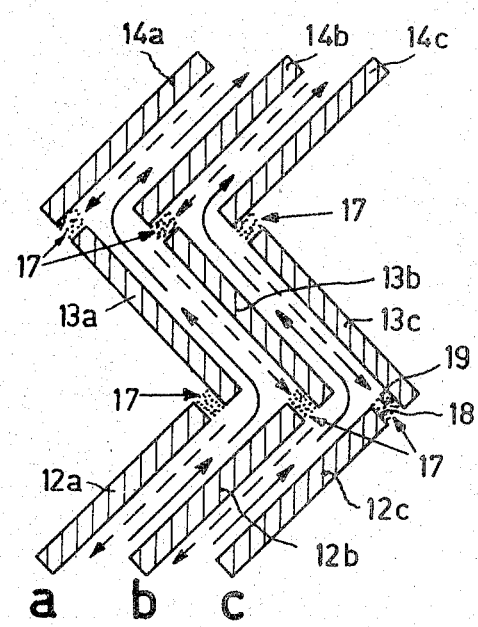
FIG. 3 is an enlarged sectional view of part of some of the filtering grids of the filter shown in FIGS. 1 and 2.

The filtering grids each comprise a plurality of strips 11 of magnetisable material arranged parallel to one another in a row extending longitudinally of the housing 1, each strip extending transversely of the housing. Three strips of each of three grids are shown in FIG. 3, the three grids being designed $a$, $b$ and $c$ and the strips being designated 12$a$, $b$ and $c$, 13$a$, $b$ and $c$ and 14$a$, $b$ and $c$ respectively. As shown in FIGS. 2 and 3, adjacent strips of each grid lie in planes which intersect one another, preferably at right angles, so that the strips of the grid, viewed end on, form a zigzag pattern. The pattern is the same for all the grids so that the strips of the several grids also form rows extending transversely of the housing 1 with the strips in each row lying parallel to one another in parallel planes. Thus, zigzag paths are formed between the grids for the flow of fluid through the housing 1. Each of these paths communicates at each end with one of the slots in the adjacent grating 7 or 8. The strips 11 are all held in position by two plates 15 and 16 of non-magnetisable material, each of which is formed with slots which are arranged in the desired pattern of the strips 11 and through which the strips extend with a close fit.

Between the strips of each filtering grid are gaps 17 (FIG. 3), and when the filter is in operation, magnetic fields are created in these gaps. As the fluid to be filtered flows past the gaps 17, the direction of flow being indicated by the full-line arrows in FIGS. 2 and 3, particles of ferromagnetic contaminant in the fluid are attracted by the magnetic fields and becomes trapped in the gaps, as shown in FIG. 3. The grating 7 at the upstream end of the housing 1 prevents any large objects entering the housing.

When it is desired to remove the trapped contaminant from the gaps 17, the filtering grids are demagnetised by switching off the supply of current to the coils 2 and the flow of fluid through the filter is reversed so that the fluid now flows in the direction indicated by the broken-line arrows in FIGS. 2 and 3. This reverse flow of fluid flushes the contaminant out of the gaps 17 and away from the filtering grids.

As can be seen in FIG. 3, the downstream edge of each strip of each filtering grid faces and is spaced from a side of the adjacent strip in the downstream direction at the upstream edge thereof. For example, the downstream edge 18 of the strip 12c in FIG. 3 faces and is spaced from the side 19 of the strip 13c at the upstream edge of the latter strip. The gaps thus formed between the strips of each filtering grid provide sheltered collecting points for particles of contaminant during filtering, but during backflushing the gaps are directly open to the flow of fluid through the filter with the result that the collected contaminant is completely flushed from the gaps.

Figure 4:
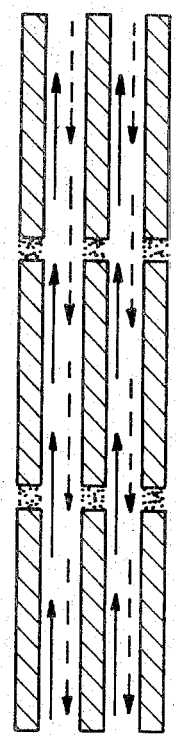
FIG. 4 is a view similar to FIG. 3 showing part of some of the filtering grids of a known filter.

FIG. 4 shows part of some of the filtering grids of a known filter, in which the strips of each grid are coplanar. In this figure also, the direction of the flow of fluid through the filter during filtering is indicated by full-line arrows and the direction during backflushing is indicated by broken-line arrows. It can be seen that while the gaps between the strips of each grid provide sheltered collecting points for the particles of contaminant during filtering, the contaminant which collects in the gaps is equally sheltered from the flow of fluid through the filter during backflushing.

What we claim is:

1. A magnetic filter for trapping and removing ferromagnetic contaminates from a fluid flowed selectively upstream and downstream through said filter, comprising a housing defining a fluid duct therethrough, the duct having a central axis with upstream and downstream ends thereof, a filtering grid situated in said duct and formed of a plurality of magnetizable strips comprising a first row of strips, each strip having an axis which is oblique to said duct axis, said strips forming a zigzag path with each strip having an upstream and a downstream end corresponding to said duct ends, and the upstream end of each strip having a side part thereof, the downstream end of each strip is adjacent and spaced from the side part of the upstream end of a strip that is downstream therefrom with a gap defined between said adjacent ends, the filter further comprising at least one additional row of strips similar to the first row and parallel thereto defining a fluid passage between said two rows, and means for selectively magnetizing and de-magnetizing said strips, whereby said ferromagnetic contaminants will be entrapped in said gaps when said fluid flows in a downstream direction while the strips are magnetized, and said trapped contaminants are flushed out of the filter when said fluid is flowed in an upstream direction while said strips are de-magnetized.

2. A filter according to claim 1 comprising additional rows of strips parallel to said first two rows, thereby forming a plurality of zigzag fluid passages between said rows.

3. A filter according to claim 1 wherein each row comprises at least three strips.

4. A filter according to claim 1 further comprising a grating at the upstream end thereof for screening large contaminants from flowing through said filtering grid.

5. Apparatus according to claim 1, wherein said means for magnetizing and de-magnetizing said strips comprises an electromagnetic coil which is carried by said housing, and which surrounds the fluid duct and filtering grid therein.

* * * * *